US006591174B2

(12) United States Patent
Chung et al.

(10) Patent No.: US 6,591,174 B2
(45) Date of Patent: Jul. 8, 2003

(54) COOLING SYSTEM CONTROLLER FOR VEHICLE

(75) Inventors: Soon Bae Chung, Daejeon (KR); Chul Sung Oh, Daejeon (KR); In Whan Seol, Daejeon (KR); Yong Won Kim, Daejeon (KR); Tae Jin Kim, Daejeon (KR)

(73) Assignee: Agency for Defense Development, Daejeon (KR)

( * ) Notice: Subject to any disclaimer, the term of this patent is extended or adjusted under 35 U.S.C. 154(b) by 13 days.

(21) Appl. No.: 09/900,304

(22) Filed: Jul. 6, 2001

(65) Prior Publication Data

US 2002/0016656 A1 Feb. 7, 2002

(30) Foreign Application Priority Data

Jul. 7, 2000 (KR) ........................................ 2000-38884

(51) Int. Cl.[7] ................................................ G06F 19/00
(52) U.S. Cl. .................... 701/36; 123/41.12; 123/41.44
(58) Field of Search .................... 701/1, 36; 123/41.12, 123/41.27, 41.44

(56) References Cited

U.S. PATENT DOCUMENTS 4,348,990 A 9/1982 Nolte et al.
4,616,602 A * 10/1986 Hirano et al. ............ 123/41.44
4,630,574 A * 12/1986 Hirano .................... 123/41.44
4,646,688 A * 3/1987 Hirano et al. ............ 123/41.44
4,694,784 A * 9/1987 Hirano et al. ............ 123/41.12
4,955,431 A 9/1990 Saur et al.
5,018,484 A 5/1991 Naitoh
5,133,302 A 7/1992 Yamada et al.
5,609,125 A 3/1997 Ninomiya
5,619,957 A * 4/1997 Michels .................. 123/41.44
5,724,924 A * 3/1998 Michels .................. 123/41.12

FOREIGN PATENT DOCUMENTS

| | | |
|---|---|---|
| KR | 1998-053078 | 9/1998 |
| KR | 1998-053909 | 9/1998 |
| KR | 1998-0185443 | 12/1998 |

* cited by examiner

*Primary Examiner*—Gary Chin
(74) *Attorney, Agent, or Firm*—Scully, Scott, Murphy & Presser

(57) ABSTRACT

A cooling system controller for a vehicle includes a radiating rate measurement unit measuring the radiating rate of a radiator, a heating rate estimation unit estimating the heating rate of a heat generating device such as an engine, transmission and brake, a heat balance comparing unit calculating a heat balance error quantity by comparing the radiating rate measured by the radiating rate measuring unit with the heating rate estimation forecasted by the heating rate estimating unit, and calculating a radiating rate follow-up value in order to achieve a heat balance with the heating rate estimate, an adaptive control unit learning state changes of the radiating device and the heat generating device and adaptively-controlling the cooling system according to the heat balance comparison by the heat balance comparing unit, and a cooling fan control unit controlling the operation of a cooling fan in order to meet the radiating rate follow-up value calculated by the heat balance comparing unit. The cooling system controller is capable of improving the cooling efficiency of the radiator by maintaining the coolant temperature as high as possible, and minimizing the required power for the cooling fan by maintaining the cooling fan speed as low as possible.

18 Claims, 6 Drawing Sheets

COOLING SYSTEM CONTROLLER FOR VEHICLE

BACKGROUND OF THE INVENTION

1. Field of the Invention

The present invention relates to a cooling system for a vehicle, in particular to a cooling system controller for a vehicle which is capable of improving cooling efficiency of a radiator by maintaining a coolant temperature as high as possible, and minimizing the required power of a cooling fan by maintaining the cooling fan speed as low as possible.

2. Description of the Prior Art

A cooling system for a vehicle is for cooling the heat generated by components such as an engine and a transmission, and maintaining the optimum temperature of the components. The temperature of combustion gas inside of the cylinder of the engine of a vehicle rises above 2,000° C. when the vehicle operates, and the temperature of a cylinder, a cylinder head and a piston valve also rises according to it. Unless this heat is removed, it may cause problems such as a mechanical trouble and a life span lowering problem due to degradation of the strength of structural parts, a power decrease due to deterioration of combustion, and an abnormal abrasion problem or a seizing problem of moving parts due to oil film damage or oil degeneration on mechanical friction portions caused by the high temperature. Accordingly, a cooling system for cooling the components is required. Meanwhile, if the coolant temperature becomes too low due to overcooling, the exhaust gas state becomes worse and the efficiency of the engine is lowered, and accordingly the cooling system is required to have a function for maintaining the temperature of the heat-generating device appropriately so as not to be too high or low.

There are two cooling methods for keeping the temperature of the heat-generating device appropriately. One is an air i.e., gas cooling method which cools the heat-generating device by using the ambient air as the heat transfer medium, and the other is a liquid cooling method which cools the heat-generating device by circulating a liquid coolant and then exhausting heat from the liquid coolant to the ambient. The latter shows better cooling efficiency than the former, and accordingly the liquid cooling method is used in general.

In the cooling system for an engine adapting the liquid cooling method, in order to cool the heat-generating device, a low temperature water-based coolant is flowed through a water jacket installed around or in an outer part of the heat-generating device such as the engine in order to cool the heat-generating device to the appropriate temperature, and while cooling the heat-generating device, the low temperature coolant becomes heated to a high temperature by heat exchange from the heat-generating device, and the high temperature coolant is flowed to a radiator and become low temperature coolant by transferring its heat to the ambient air at the radiator, and the low temperature coolant is flowed again into the water jacket of the heat-generating device by a pump in order to cool the heat-generating device, and the above-described process is performed continuously. Herein, a cooling fan is installed on one side of the radiator in order to force the cooling air for cooling the liquid coolant flow through the radiator, and the heat exchange between the cooling air and the liquid coolant is performed by the radiator.

As depicted in FIG. 1, the required power HP needed for driving the rotating operation of the cooling fan and the cooling air flow rate Q provided to the radiator by the rotating operation of the cooling fan have a nonlinear relation to the cooling fan speed n. In particular, the required power is considered to be proportional to the cube of the cooling fan speed. Accordingly, when the cooling fan speed is lowered, the required power decreases greatly. Meanwhile, the heat transfer efficiency or cooling efficiency heightens in proportion to the higher temperature of the coolant at the inlet of the radiator flowed from the heat-generating device, because the heat transfer from the radiator to the cooling air can be quickly performed when the temperature difference between the hot coolant and the cooling air is large, and accordingly, the higher the coolant temperature rises, the smaller the cooling air flow rate required to perform the cooling sufficiently, and the cooling fan speed can be lowered accordingly. As described above, maintaining the temperature of the coolant at a high state enables the decreasing of the cooling fan speed and the required power for the cooling the fan.

As depicted in FIG. 1, by raising the coolant temperature at the radiator, the cooling fan speed can be lowered from n1 to n2 and the cooling air flow rate is decreased from Q1 to Q2. Although the cooling effect is the same, the required cooling power for driving the cooling fan can be different in accordance with a control method of the cooling fan.

There are two control methods for controlling the cooling fan. One method is an ON/OFF control method as the simplest method which controls the cooling fan to be either ON/OFF, and the other method is to adjust the average speed of the cooling fan about time to be n1 by controlling the ON/OFF state of the cooling fan repeatedly. The average speed increases in proportion to the time duration of the ON state of the cooling fan, and the required power increases in proportion to average speed. It can be defined by Equation 1.

$$HPd2 = \left(\frac{n_2}{n_1}\right) HPd1 \qquad \text{[Equation 1]}$$

As defined in Equation 1, the required power decreases in proportion to the variation of flow rate of the cooling air. However, the required power is in direct 1:1 proportion to the fan speed. Accordingly, the advantage of the higher coolant temperature is not so great because the decrease in the required power from HPd1 to HPd2 is small.

The other method is a stepless speed control method which is capable of reducing the required power more in comparison with the ON/OFF control method with the equal flow rate of the cooling air, and accordingly it is a more efficient method than the ON/OFF control method. Applying the example described above, the cooling fan speed can be lowered from n1 to n2 when the flow rate of the cooling air is decreased from Q1 to Q2. The required power decreases from HPc1 to HPc2 due to the increase in the coolant temperature, namely, the change of the required power is in proportion to the cube of the cooling fan speed. It can be defined as in the following Equation 2.

$$HPc2 = \left(\frac{n_2}{n_1}\right)^3 HPc1 \qquad \text{[Equation 2]}$$

In this case, the required power for the cooling fan is very sensitive to the variation in the coolant temperature and decreases on a large scale with a small change in the flow rate of the cooling air. Therefore, it is clear that the stepless speed control method is more efficient, and the coolant temperature in the radiator should be kept as high as possible in order to obtain the highest efficiency from the cooling system.

In the conventional cooling control methods, the coolant temperature is maintained lower than the optimum coolant temperature in order to prevent overheating, and the cooling fan speed is controlled by various methods in accordance with the coolant temperature. As depicted in FIG.2, a multilevel speed control method has been dominant among the conventional methods. In this method, the cooling fan speed is determined in accordance with the coolant temperature by referring to a look-up table in a digital control unit, or is controlled by a thermostatic switch in a sequence control unit. The control of the cooling fan speed is divided into about four steps. As depicted in FIG.2, the coolant temperature is usually controlled in a much lower range than the optimum temperature because of the large variation between steps. This type of control method is described in U.S. Pat. Nos. 4,955,431, 5,018,484, 5,133,302, and Korean Patent 0185443 and Korean Laid-Open Patent Publication No. 1998-053909.

Meanwhile, in the conventional stepless variable speed control method, the cooling fan speed is controlled in proportion to the operation temperature. Although this method enables to get the coolant temperature closer to the optimum temperature than the multilevel speed control method, the variation in the coolant temperature is still large, and accordingly the temperature of the coolant has to be kept at least 5°~10° lower than the optimum temperature. The conventional stepless variable speed control method in which the fan speed is controlled proportionally to the coolant temperature is described in the U.S. Pat. No. 5,609,125 and Koran Laid-Open Patent Publication No. 1998-053078.

As described above, the required power for cooling can be minimized by maintaining the cooling fan speed as low as possible and maintaining the coolant temperature as high as possible, but this type of control method has not been embodied in the conventional cooling system because of the following problems.

The first problem is a time delay phenomenon of the cooling system. When a vehicle operates, the states of the engine and transmission are rapidly changed in accordance with the operating environment. When the heating rate of the heat-generating device varies widely due to the abrupt change in the operating environment, a certain time is required to cool the heated coolant to the optimum temperature. In other words, a time delay occurs. As depicted in FIG. 3, the cooling fan starts to work at the time t1 and stops at the time t3, but the coolant temperature does not begin to lower instantly, but rises until the time t2 after a certain time from the time t1, reaches the highest temperature at the time t2, and reaches the lowest temperature at the time t4 after a certain time from the time t3. Due to this time delay, although the cooling fan quickly operates, the coolant can become overheated, because the coolant temperature continuously rises for a certain time without lowering instantly, and accordingly the coolant temperature has to be kept lower than the optimum temperature in the conventional method in view of this problem.

The second problem is the uncertainty of the operating environment. The heat transfer efficiency of the radiator changes according to the ambient atmospheric temperature, and even when the heating rate is constant, the cooling fan speed may need to be changed in accordance with the ambient atmospheric temperature. In particular, the change in heat transfer characteristics of the heat exchanger device caused by the ambient atmospheric humidity and pressure, abrupt change in the heating rate due to vehicle braking, engine braking and operation of an air conditioner, and operating efficiency of the cooling fan during the vehicle operation are the major uncertainties of the operating environment. As described above, the uncertainty of the operating environment is a big problem for determining the cooling fan speed on the basis of the coolant temperature.

The third problem is the variation in the operation circumstances due to deterioration of the heat-generating device and the radiator. When the heat-generating device such as the engine or transmission deteriorates with age, the operating efficiency thereof becomes reduced and the heating rate increases, and when the radiator deteriorates due to the passage of time, the heat transfer efficiency is lowered. In this case, the coolant temperature has to be set much lower than the optimum temperature in consideration of the deterioration of the radiator.

Because of the above-mentioned problems, the conventional cooling system has to maintain the coolant at a lower than optimum temperature for obtaining adequate cooling efficiency.

SUMMARY OF THE INVENTION

An object of the present invention is to provide a cooling system for a vehicle which is capable of improving the heat transfer efficiency of a radiator and minimizing the power required for cooling by using a high coolant temperature for obtaining the optimum cooling efficiency and preventing an overheating problem due to time delay characteristics of a cooling system.

Another object of the present invention is to provide a cooling system for a vehicle which is capable of improving the heat transfer efficiency of a radiator and minimizing the power required for cooling by using a high coolant temperature for obtaining the optimum cooling efficiency by considering operational circumstances of the vehicle in speed control of the cooling fan.

A further object of the present invention is to provide a cooling system for a vehicle which is capable of improving the heat transfer efficiency of a radiator and minimizing the power required for cooling by using a high coolant temperature for obtaining the optimum cooling efficiency by considering the deterioration of a heat generation device and radiator caused by the passage of time in speed control of the cooling fan.

DETAILED DESCRIPTION OF THE PREFERRED EMBODIMENT

Figure 1:
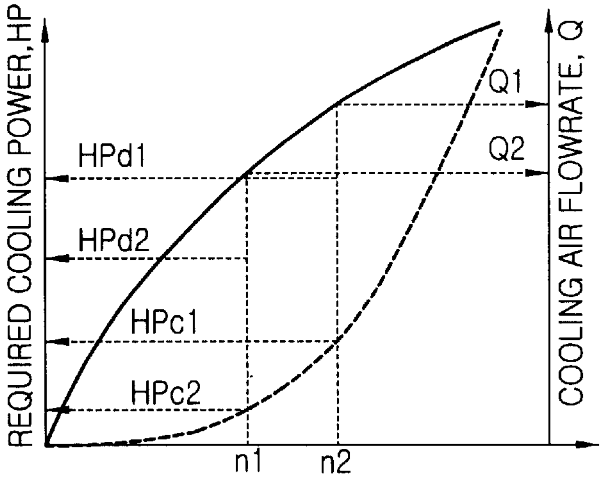
FIG. 1 is a graph illustrating a general relation between cooling fan speed, power required for cooling, and flow rate of the cooling air.

In order to achieve the above-mentioned objects of the present invention, the cooling system for a vehicle of the present invention includes a radiating rate measuring unit for measuring the radiating rate of a radiator, a heating rate estimation unit for estimating the heating rate of a heat generation device such as an engine, transmission or brake, a heat balance comparing unit for calculating a heat balance error quantity by comparing the radiating rate measured by the radiating rate measuring unit with the heating rate estimated by the heating rate estimation unit, and calculating a radiating rate follow-up value in order to achieve a heat balance with the heating rate estimate, an heating adaptation unit for learning and adaptively-controlling the state change of the heat exchanger device and the heat generation device according to the heat balance comparison performed by the heat balance comparing unit, and a cooling fan control unit for controlling the operation of a cooling fan in order to achieve the radiating rate follow-up value calculated in the heat balance comparing means.

The present invention will now be described in detail.

As noted, because of the above-mentioned problems, the conventional cooling system can not use a high coolant temperature for achieving optimum cooling efficiency. Accordingly, the present invention provide s solutions corresponding to each problem.

First, a prediction control method considering the heat balance is adapted in the present cooling system in order to minimize the time delay of the cooling system. The conventional cooling control system adjusts the radiating rate on the basis of the coolant temperature, but the prediction cooling control method considering the heat balance according to the present invention predicts the heating rate of a heat-generating device such as an engine, transmission, etc., and operates the cooling fan in advance in order to generate a radiating rate corresponding to the predicted heating rate. In other words, the coolant temperature can be kept as uniformly high as possible by operating the cooling fan in advance according to the variation of the predicted heating rate estimated by the heating rate estimating unit in order to compensate for the time delay in the temperature rise of the coolant according to an increase in the heating rate, and compensate for the time delay of the temperature fall of the coolant according to an increase in the heating rate. The prediction control method considering the heat balance according to the present invention is capable of maintaining the coolant temperature as high as possible by overcoming the double time delay problem of the heat generation and heat release which occur inevitably when the cooling fan control is performed on the basis of the coolant temperature.

Second, measurement of the radiating rate in real-time and the heating rate estimating unit are adopted in order to minimize the influence of the uncertainty of the operational environment. Precision temperature sensors are installed at both the inlet and outlet of the radiator, and data on the speed of the coolant pump is inputted in order to measure the radiating rate. The heating rate estimating unit can be adapted with the precise real-time measurement of the radiating rate. It is based on the heat balance of the cooling system, and semiconductor temperature sensors can be used as the precision temperature sensors. In operation of a vehicle, the variation in the heat transfer efficiency due to variation of the ambient air temperature can be solved by the real-time measurement of the radiating rate, and the abrupt variation in the heating rate due to the braking of the vehicle and engine can be predicted by the heating rate estimating unit. An adaptive estimating unit is required as the heating rate estimating unit in order to learn according to the measured radiating rate, and an intelligent control type heating rate estimating unit having good adaptability such as a neuro-fuzzy logic type or a genetic algorithm type can be used in the present invention. Accordingly, the precise measurement of the radiating rate and an intelligent control type heating rate estimation unit are adopted in the present invention in order to prevent overheating of the internal-combustion engine by minimizing the influence of the uncertainty of the operating environment.

Third, a learning control is adopted in order to solve the problem of deterioration of the heat exchanger device and heat generation device. In other words, the learning control of the heat transfer factor and heat generation factor based on the heat balance of the cooling system can avoid the problem of variation of the operating circumstances due to the deterioration. The variation of the heat transfer factors such as the efficiency of the radiator, efficiency of the coolant pump, and efficiency of the cooling fan can be compensated by the learning control through the precise measurement of the radiating rate, and the variation of the heat generation factor due to the deterioration of the heat exchanger detected through the heating rate estimating unit can be compensated by the learning control.

Figure 4:
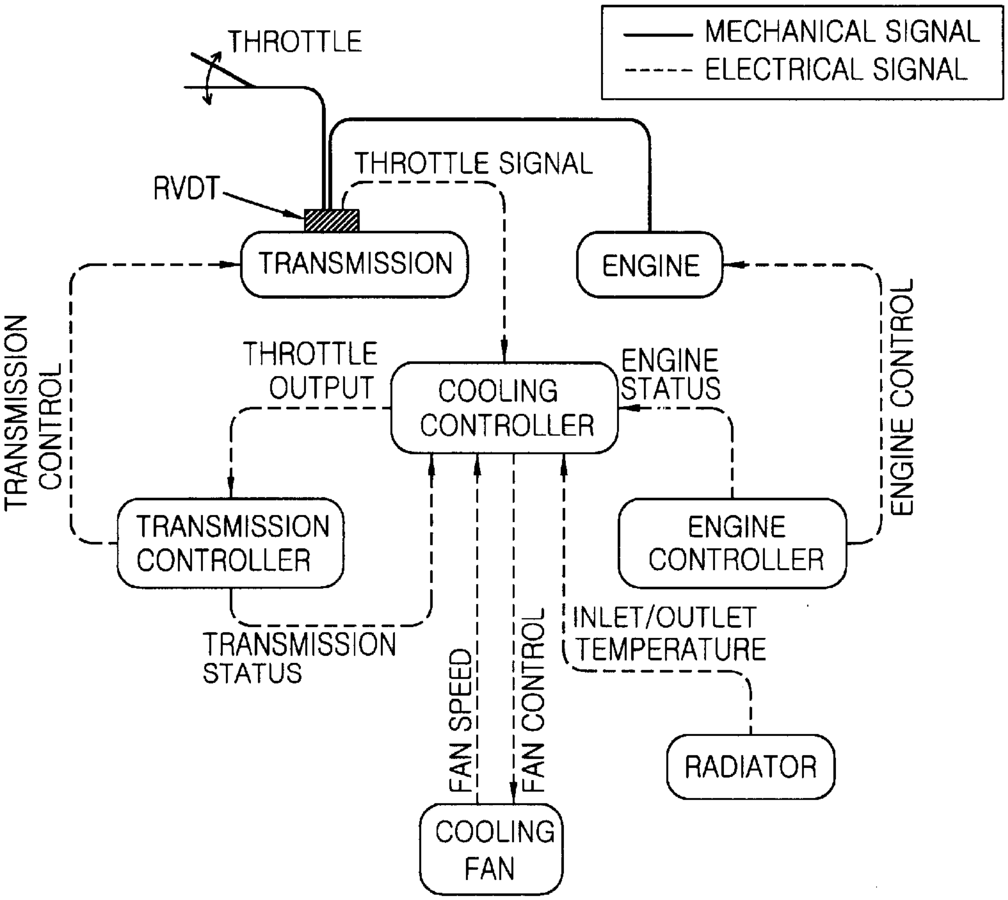
FIG. 4 is a block diagram of a cooling system according to the present invention.

FIG. 4 is a block diagram of the cooling system according to the present invention. In the cooling system of the present invention, a cooling controller monitors the status of the engine and transmission on an engine controller and a transmission controller, measures the radiating rate from the monitoring the inlet and outlet temperatures of the radiator and the speed of the coolant pump, and accordingly controls the cooling fan speed.

Figure 2:
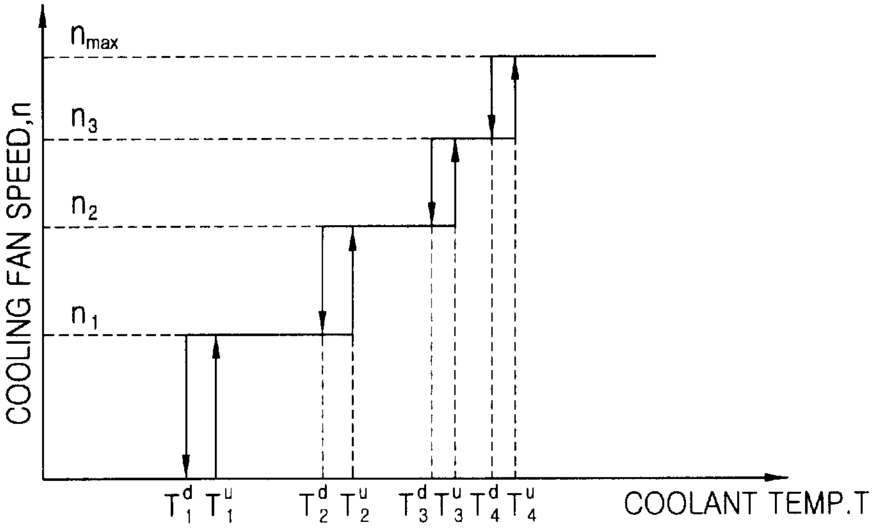
FIG. 2 is a graph illustrating control characteristics of the conventional multilevel speed control cooling system.
Figure 3:
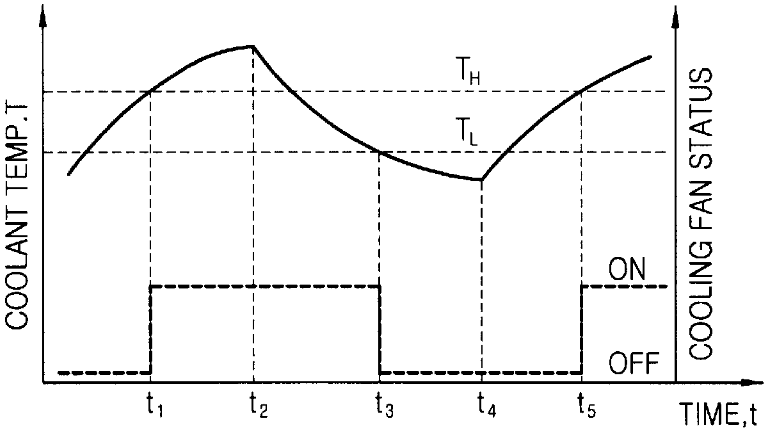
FIG. 3 is a graph illustrating time delay characteristics of the conventional cooling system.
Figure 5:
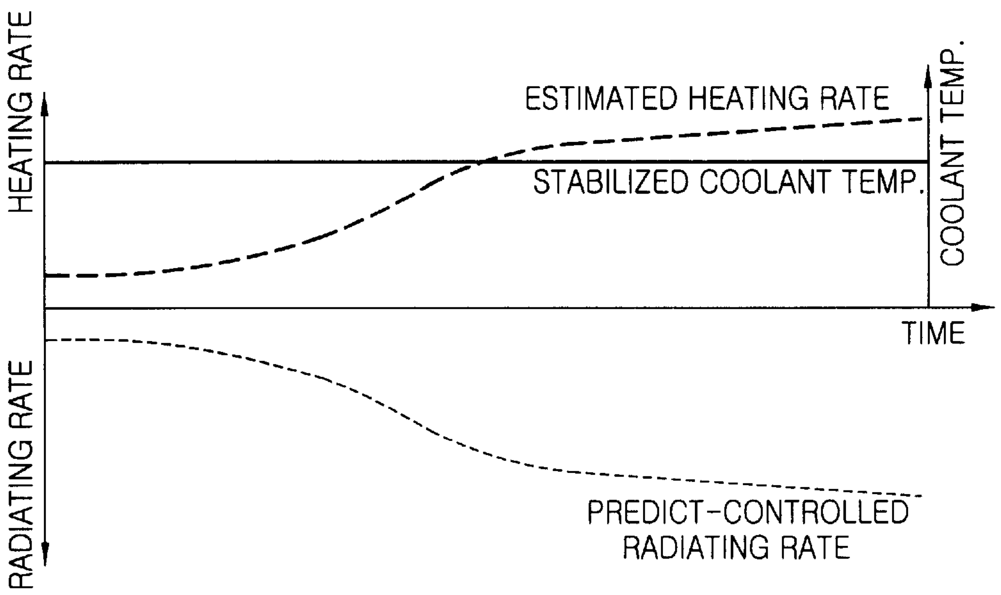
FIG. 5 illustrates control characteristics of the cooling system according to the present invention.

FIG. 5 illustrates the control characteristics of the cooling system according to the present invention, from which it may be seen that the required power for cooling decreases significantly in comparison with the conventional cooling system depicted in FIG. 2 or FIG. 3, by stabilizing the coolant temperature as high as possible and maintaining the cooling fan speed as low as possible. The temperature variation attributable to the time delay is decreased and the coolant temperature is kept as high as possible by predicting the heating rate in accordance with any abrupt increase in the heating rate and boosting the cooling fan speed, whereby the cooling efficiency is improved considerably.

Hereinafter, the present invention will now be described in more detail with reference to the accompanying drawings.

Figure 6:
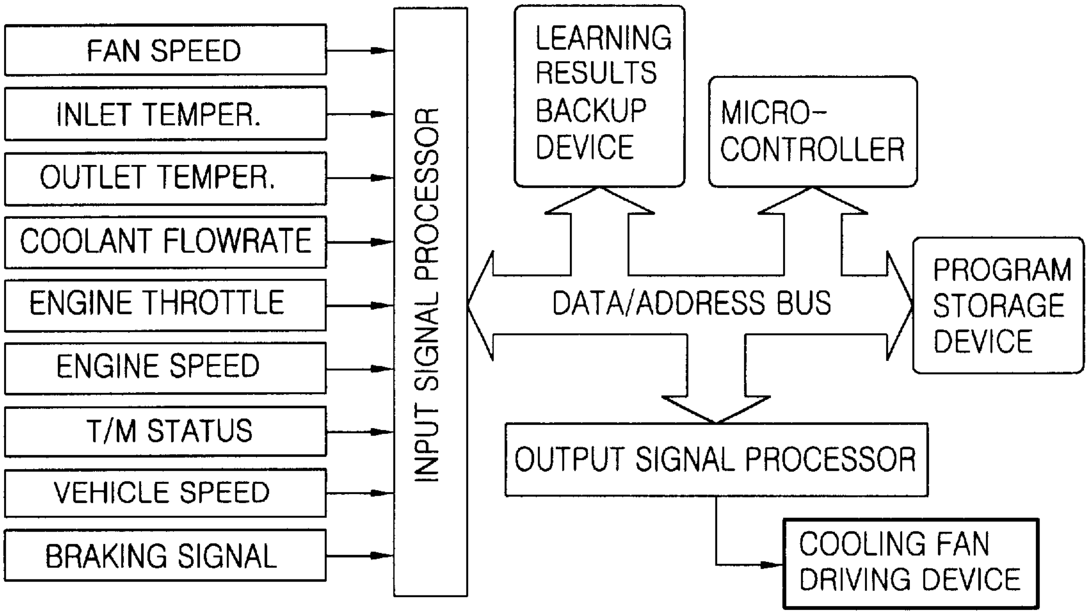
FIG. 6 is a block diagram illustrating a control operation of the cooling system according to the present invention.

FIG. 6 is a block diagram illustrating the cooling control system for a vehicle according to the present invention. The cooling control system is a digital control type controlled by a micro-controller arid includes a learning results backup unit storing the learnt heat release factors and heat generation factors in accordance with the operating environment, and a program storage device for the problems which perform the heat balance prediction and input/output signal processing. In addition, the cooling control system includes an input signal processor processing input signals of the cooling fan speed, inlet temperature of the radiator, outlet temperature of the radiator, speed of the coolant pump, engine throttle position, engine speed, the state of the transmission, vehicle speed and braking signal by performing amplification and digitalization of the input signals, and an output signal processor outputting signals for controlling the cooling fan operating unit and having an input/output interface circuit for amplifying an operating signal.

Figure 7:
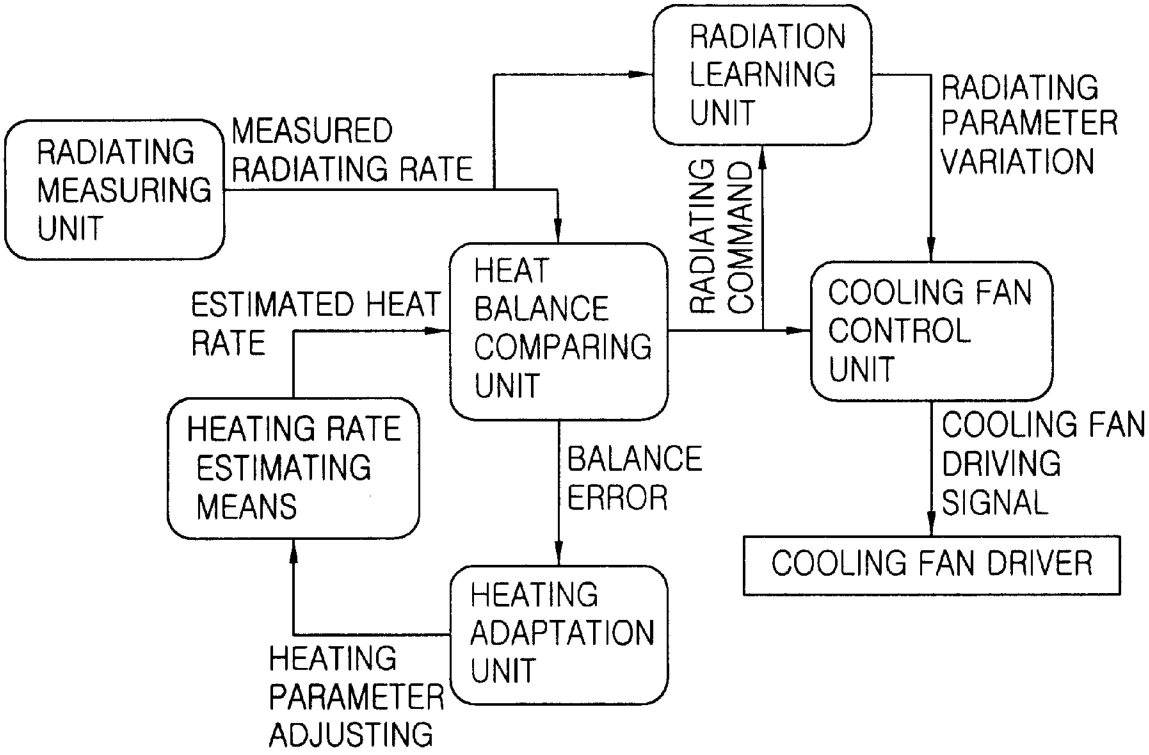
FIG. 7 is a block diagram illustrating a heat balance prediction control according to the present invention.

FIG. 7 is a block diagram illustrating the heat balance prediction control according to the present invention. The radiating rate is precisely measured by using the temperature difference between the inlet and outlet of the radiator and the flow rate of the coolant as the input signals.

The heating rate estimation unit as an important part of the heat balance prediction control includes an engine heating rate estimating unit, a transmission heating rate estimating unit, and an additional heating rate estimating unit. The engine heating rate estimating unit estimates the engine heating rate from the input of throttle position and speed of the engine, the transmission heating rate estimating unit estimates the heating rate of the transmission from the input of the speed of the vehicle, a variable speed efficiency map, discharge quantity (stroke) of a hydraulic unit, engine power output, and braking state.

Meanwhile, the additional heating rate estimating unit uses an estimator corresponding to the condition of the engine and transmission, and for this an intelligent control estimator or a Kalman estimator can be used. The additional heating rate estimating unit estimates the nonlinear region of the heating rate calculation of the engine and transmission due to the uncertainty of the external operating environment by using the variation in the heating rate due to braking energy as a basic model, and estimates uncertain heating rate which can not be predicted such as a heating rate from the air conditioner and hydraulic heat exchanger unit. The additional heating rate estimating unit is based on the theory that when the coolant temperature is stabilized, in other words, a heat balance state is achieved by feedback control, the total heating rate is equal to the total radiating rate. Here, the radiating rate can be measured in real-time by using the temperature difference between the inlet and outlet temperatures of the radiator and the flow rate of the coolant, and accordingly the additional heating rate estimating unit enables the heating rate estimating unit to adapt to the operating environment on the basis of the measured radiating rate.

The heating adaptation unit adapts to the heat generation parameters so as to minimize the difference between the radiating rate and heating rate. In other words, the real-time adaptation of the cooling fan speed to the heat generation parameters can be performed by using the characteristic that the radiating rate is equal to the heating rate when a heat balance is maintained while the coolant temperature is stabilized. Here, the adapted heat generation parameters are the additional heating rate, the heating rate coefficient of the engine, and the heating rate coefficient of the transmission, etc.

The cooling fan control unit performs a predictive control of the cooling fan speed in order to maintain the coolant temperature within the a preset range as a follow-up coolant temperature, and controls the cooling fan so as to precisely discharge the calculated radiating rate. In order to implement the predictive control, the cooling fan speed control for following accurately a radiating rate follow-up value is required, because the relation between the radiating rate and the cooling fan speed is always changing due to the uncertainty of the operating environment factors such as atmospheric temperature and humidity, and accordingly, the radiating parameters learning unit for learning such varying relationship in real-time is employed.

The radiating parameters learning unit is constructed so as to minimize the control error between the radiating rate follow-up value and the measured radiating rate. The real-time learning of the radiating parameters is important in order to decrease the radiating control error of the cooling fan speed due to the uncertainty of the operating environment. Here, the radiating coefficient of the cooling fan is the most important factor among the learned radiating factors, the quantity of the learning has to be adjusted according to the characteristics of the cooling system.

Figure 8A:
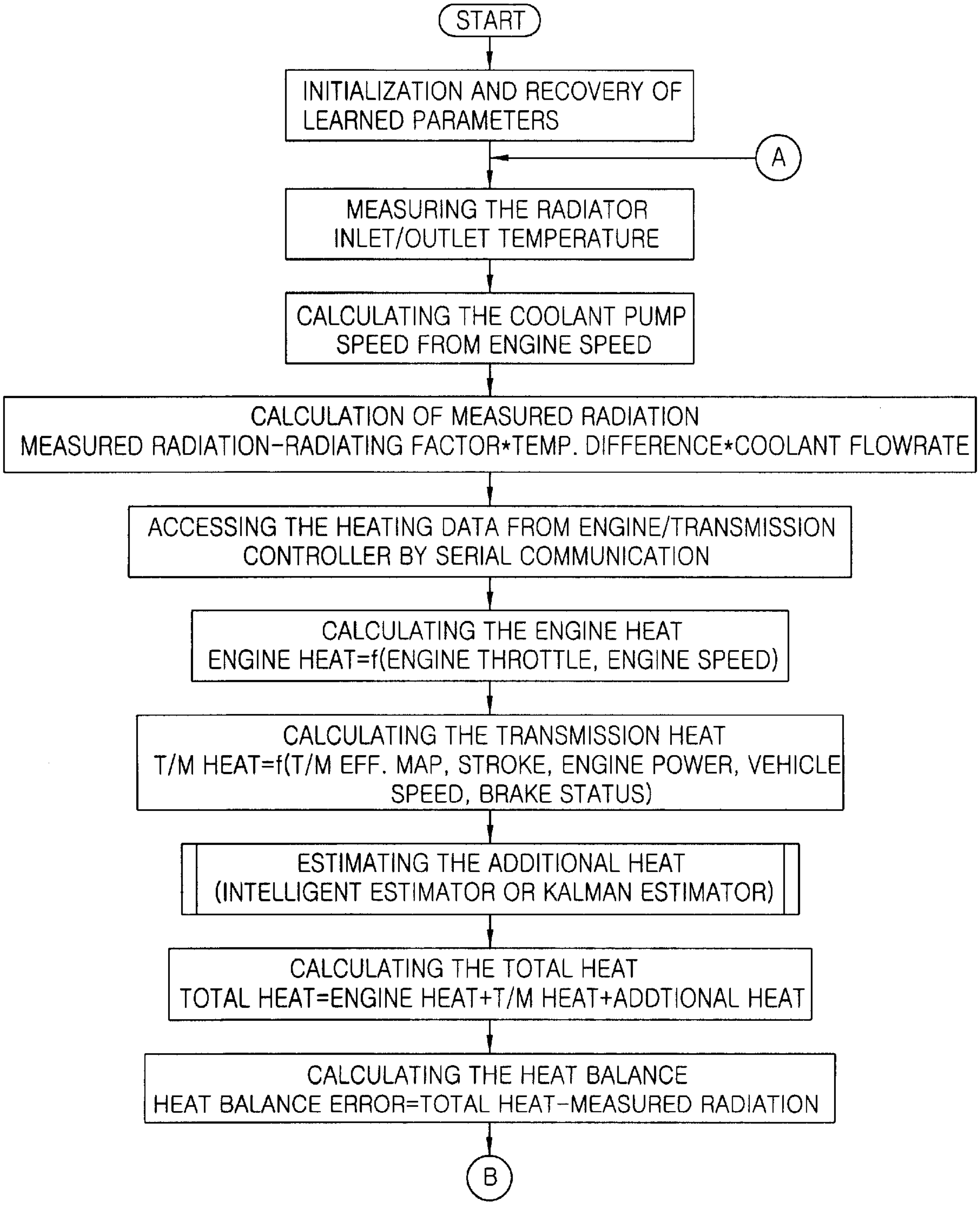
FIGS. 8A and 8B are a flow charts illustrating the control operation of the cooling system according to the present invention.
Figure 8B:
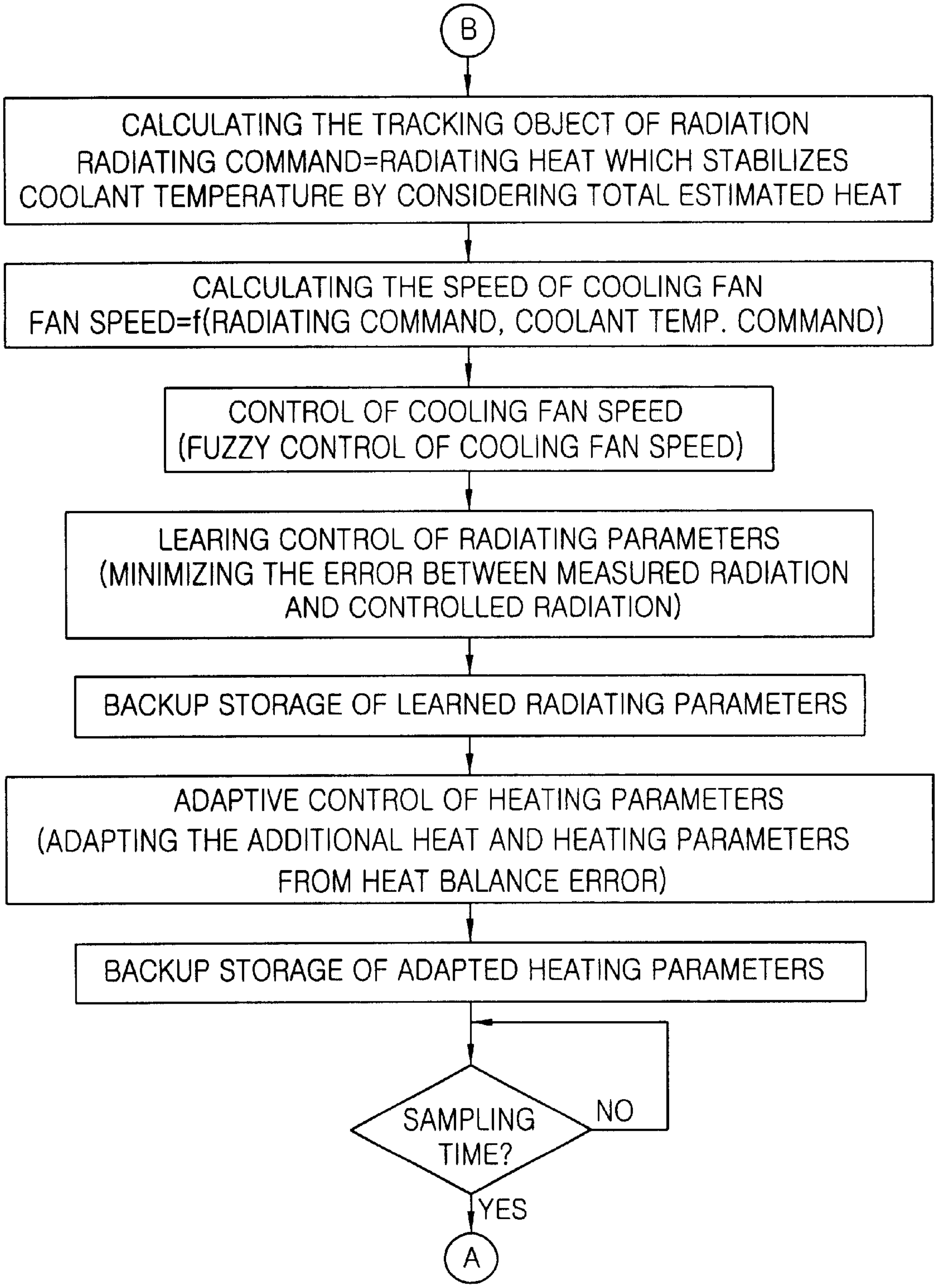

FIGS. 8A and 8B are flow charts illustrating the control of the cooling system comprising the above-described construction according to the present invention. As depicted in FIGS. 8A and 8B, in the control of the cooling system of the present invention, at first initialization of the program and recovery of the learned parameters are performed. This is a preparatory operation in performing the operating program of the micro-controller, in which initial calculation of various conversion factors and the setting of various control factors of the micro-controller are performed, and each control variable is restored after reading the previously learned results of the learning factors which are related to the radiating and heat generation factors of the heating rate estimating unit. After the recovering the various learning parameters, program flow waits until the coolant temperature reaches the set temperature, by monitoring the cooling system status.

In order to calculate the heat balance, the heating rate is first measured, and the inlet and outlet temperatures of the radiator are measured. Here, it is preferable, for the temperature sensors at the radiator inlet and outlet, to use semiconductor temperature sensors which are precise and exhibit good linearity. The precise measurement of the radiating rate is very important in the predictive heat balance control. Particularly, temperature sensors which are capable of minimizing the nonlinearity of the measurement of the radiating rate are essential, and compensation of the initial temperature difference is very important.

In order to measure the radiating rate, the temperature difference and flow rate of the coolant passing through the radiator are required. The flow rate of the coolant passing through the radiator is calculated by multiplying the discharge quantity of the pump by the speed of the coolant pump. The speed of the coolant pump is calculated from the engine speed, as it is in proportion to the engine speed. The total radiating rate is calculated taking into consideration the heat radiating coefficient, and it can be calculated as in the below EQUATION 3.

[EQUATION 3]

Measured radiating rate [*k*]=heat radiating coefficient×temperature difference between inlet and outlet of the radiator×flow rate of the coolant In order to estimate the heating rate of the engine and transmission, the engine control status and transmission control status are read by the cooling controller's micro-controller through the communication with the engine controller and transmission controller. The heating rate of the engine is calculated as a function of engine throttle position and engine speed, the variation in the heating rate of the engine according to the atmospheric air condition is considered as an additional heating rate and is estimated by the heating rate estimating unit. The heating rate of the engine can be estimated by a three-dimensional function equation with an engine fuel consumption map and an engine output map, using the parameters of engine throttle position and engine speed.

The heating rate of the transmission can be calculated by estimating a power transfer heating rate taking into consideration the engine output and a gearshifting efficiency map according to a transmission stroke and variable speed extent, and calculating a braking heating rate by using the deceleration of the vehicle calculated from the speed of the vehicle. The gearshifting efficiency map for calculating the power transfer heating rate can be implemented as a one-dimensional map, but in order to get a more accurate gearshifting heating rate, a two-dimensional map according to speed of the vehicle and engine output is more preferable. The power transfer heating rate can be calculated by the below EQUATION 4.

[EQUATION 4]

Power transfer heating rate=engine output [throttle, engine speed]×(1−gearshifting efficiency [speed of the vehicle, engine output])

When the vehicle is stopped by the brake, in the transmission having a retarder as a hydraulic brake, the braking heating rate can be calculated by the below EQUATION 5.

[EQUATION 5]

Braking heating rate=heat generation coefficient×(previous $speed^2$−present $speed^2$)

The additional heating rate is calculated by using an estimator for unknown heating rate on the theoretical basis of a heat balance condition where the whole heating rate is equal to the whole radiating rate. The additional heating rate is estimated with an estimator such as an intelligent type or Kalman type by using as the input the previous heat balance error. In a digital Kalman recursive estimator, the additional heating rate can be calculated as by the below EQUATION 6.

[EQUATION 6]

Additional heating rate [$k$+1]=$A$×additional heating rate [$k$]+$L$× heat balance error [$k$]

Here, A is a state vector in accordance with the characteristics of the system, L is a Kalman gain vector, and the additional heating rate [k] is a vector function and its order is determined in accordance with the characteristics of the system.

The total heating rate is calculated by the below EQUATION 7.

[EQUATION 7]

Total heating rate [$k$]=engine heating rate+power transfer heating rate+braking heating rate+additional heating rate The heat balance error can be calculated from the above total heating rate by the below EQUATION 8. Herein, $\tau$ is the time delay between heat generation and heat radiating.

[EQUATION 8]

Heat balance error [$k$+1]=total heating rate [$k-\tau$]−measured radiating rate [$k$]

The cooling fan speed is controlled by a fuzzy logic controller using a two-dimensional, fuzzy membership function with respect to heat balance error and coolant temperature error. In other words, the fuzzy logic controller constructs fuzzy rules using a two-dimensional membership function format. The change in the cooling fan speed can be calculated by the below EQUATION 9.

[EQUATION 9]

Change of the cooling fan speed=cooling fan heat radiating coefficient [cooling fan speed]×Fuzzy2D [heat balance error, coolant temperature error]

Herein, the error in the coolant temperature is the difference between the preset coolant temperature and present coolant temperature. The cooling fan coefficient is the heat radiating parameter learned in accordance with the change in the ambient atmospheric air and is an one-dimensional functional formula according to the cooling fan speed. The cooling fan coefficient parameter is an interval one-dimensional equation divided into several steps in accordance with the cooling fan speed, and is learned by a learning algorithm. The learnt heat radiating parameter and the adaptation result of the additional heating rate are temporarily stored in a RAM, and then they are stored in a non-volatile memory at certain time intervals or at a certain learning stage, and then each parameter is recovered during the initialization of the system.

The cooling fan can be operated by a hydraulic actuator or an electric motor.

The present invention is capable of improving the heat radiating efficiency of the radiator and minimizing the required power for the cooling fan by preventing overheating due to the time delay characteristics of the cooling system and by using a high coolant temperature so as to get the optimum cooling efficiency.

In addition, the present invention is capable of improving the heat radiating efficiency of the radiator and minimizing the required power for the cooling fan by using a high coolant temperature so as to get the optimum cooling efficiency by considering the variation in the operating environment in adjustment of the cooling fan speed.

In addition, the present invention is capable of improving the heat radiating efficiency of the radiator and minimizing the required power for the cooling fan by using a high coolant temperature in order to get the optimum cooling efficiency by considering the variation in the operational circumstances due to the deterioration of a heat generating device and the radiator in adjustment of the cooling fan speed.

What is claimed is:

1. A cooling system controller for a vehicle, comprising a radiating rate measuring means for measuring a heat radiating rate of a heat readiating device;

a heating rate estimating means for estimating a heating rate of a heat-generating device of the vehicle;

a heat balance comparing means for calculating a heat balance error value by comparing the radiating rate measured by the radiating rate measuring means with the heating rate estimate estimated by the heating rate estimating means, and calculating a succeeding heat radiating rate in order to achieve a balance with the heating rate estimate;

an adaptive control means for learning changes of a heat transfer factor of the heat radiating device and a heat generating factor of the heat-generating device and adaptively-controlling the cooling system in accordance with the heat balance error value calculated by the heat balance comparing means and the changes of the heat transfer factor and heat generation factor; and a cooling fan control means for controlling the operation of a cooling fan in accordance with the succeeding radiating rate calculated by the heat balance comparing means.

2. The cooling system for a vehicle according to claim 1, wherein the radiating rate measuring means measures the heat radiating rate by measuring a coolant temperature difference between an inlet and an outlet of the radiator, and estimates the coolant flow rate from the speed of an engine of the vehicle.

3. The cooling system for a vehicle according to claim 2, wherein the coolant temperature at the inlet and outlet of the radiator is sensed by semiconductor temperature sensors.

4. The cooling system for a vehicle according to claim 1 wherein the heating rate estimating means estimates the heating rate based upon the values of an engine heating rate;

a transmission heating rate;

a brake heating rate; and an additional heating rate estimator, said additional heating rate estimator for estimating an error in the engine heating rate, transmission heating rate, and brake heating rate, and also estimating an unknown heating rate.

5. The cooling system for a vehicle according to claim 4, wherein the engine heating rate is calculated from engine throttle position and engine speed.

6. The cooling system for a vehicle according to claim 4, wherein the transmission heating rate is calculated from a power transmitting efficiency map calculated from input data of vehicle speed, engine speed and engine output power.

7. The cooling system for a vehicle according to claim 4, wherein the brake heating rate is calculated from a kinetic energy change quantity of the vehicle based on vehicle speed change.

8. The cooling system for a vehicle according to claim 4, wherein the additional heating rate is calculated from the heat balance error value calculated by the heat balance comparing means.

9. The cooling system for a vehicle according to claim 4, wherein the additional heating rate estimator is a neuro-fuzzy estimator.

10. The cooling system for a vehicle according to claim 4, wherein the additional heating rate estimator is a genetic algorithm estimator.

11. The cooling system for a vehicle according to claim 4, wherein the additional heating rate estimator is a Kalman filter estimator.

12. The cooling system for a vehicle according to claim 1, wherein the cooling fan control means controls the operation of the cooling fan by a stepless speed control method.

13. The cooling system for a vehicle according to claim 1, wherein the cooling fan control means performs a predictive control of the heat radiating rate in consideration of the heat balance.

14. The cooling system for a vehicle according to claim 12, wherein the cooling fan is operated by a hydraulic actuator.

15. The cooling system for a vehicle according to claim 12, wherein the cooling fan is operated by an electric motor.

16. The cooling system for a vehicle according to claim 1, wherein the adaptive control means learns a heat transfer coefficient of the cooling fan.

17. The cooling system for a vehicle according to claim 1, wherein the adaptive control means learns an additional heating rate for estimating error in an engine heating rate, a transmission heating rate, and a braking heating rate, and also estimating an unknown heating rate.

18. The cooling system for a vehicle according to claim 1, wherein the adaptive control means further comprises a storing means as a back-up storage.

* * * * *